Figure 1:
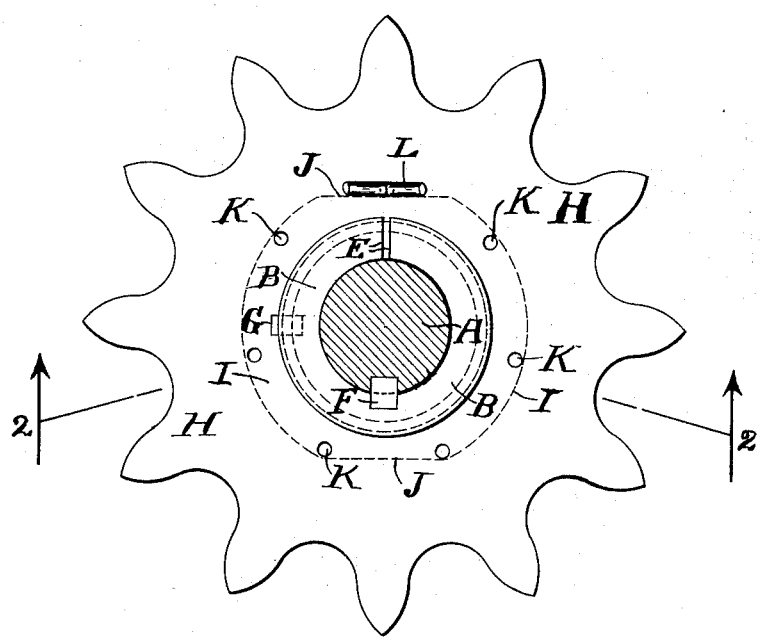

O. CULLMAN.
DETACHABLE SPROCKET WHEEL.
APPLICATION FILED JUNE 8, 1908.

958,955.

Patented May 24, 1910.

WITNESSES:

INVENTOR
Otto Cullman,
By Charles Turner Brown,
ATTORNEY

UNITED STATES PATENT OFFICE.

OTTO CULLMAN, OF CHICAGO, ILLINOIS.

DETACHABLE SPROCKET-WHEEL.

958,955.

Specification of Letters Patent.   Patented May 24, 1910.

Application filed June 8, 1908.   Serial No. 437,378.

*To all whom it may concern:*

Be it known that I, OTTO CULLMAN, a citizen of the United States, and a resident of Chicago, in the county of Cook and State of Illinois, have invented certain new and useful Improvements in Detachable Sprocket-Wheels, of which the following, when taken in connection with the drawing accompanying and forming a part hereof, is a full and complete description, sufficient to enable those skilled in the art to which it pertains to understand, make, and use the same.

This invention relates to sprocket wheels used principally on the counter shafts of what are known as side drive chain gear automobiles; and the object of the invention is to obtain a sprocket wheel which can be shifted laterally to adjust it on the counter or jack shaft to line it up with the sprocket wheel corresponding therewith on the rear wheel of the automobile.

To those skilled in the art it is known that the sprocket wheel on the counter shaft or jack shaft of automobiles of the class to which the device embodying this invention is applied should be lined with the rear wheel sprocket wheels on the driving wheels of the automobile when the automobile is at the factory; and that, because by use of the automobile the springs thereof, at times, sag one or the other way thereby bringing the sprocket wheels out of line, means should be provided to easily line up such sprocket wheels whenever desired; and this device is designed to permit the ready shifting of the sprocket wheel on the jack shaft, to again line it up with its corresponding sprocket wheel on the rear wheel of the automobile and to secure the same in its newly adjusted position.

Figure 2:
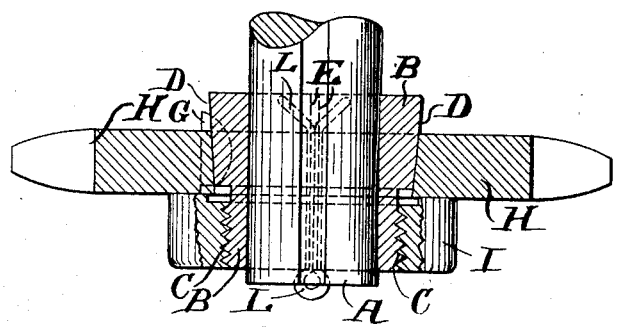

In the drawing referred to Figure 1 is a front elevation of a device embodying this invention, mounted on a counter shaft, such counter shaft being shown in section. Fig. 2 is a sectional view of the device on line 2—2 of Fig. 1, viewed in the direction indicated by the arrows.

A reference letter applied to designate a certain part is used to indicate such part throughout the several figures of the drawing wherever the same appears.

A is a counter shaft.

B is a collar or sleeve provided with screw threads C at one end thereof and with the conical periphery D at the other end thereof. Collar or sleeve B is split, that is, it has a part thereof cut out therefrom throughout the entire length, as indicated by broken lines E.

The counter shaft A and collar B are also counter sunk in the usual way to permit the key F to be put in place to lock the counter shaft and collar so that the sprocket wheel will be held rigidly to the counter shaft to rotate therewith. Such collar is also recessed on the conical periphery thereof to permit the insertion of the key G; and H is a sprocket wheel having a central hole therein corresponding with the conical periphery of the collar or sleeve B and arranged to fit thereover. The sprocket wheel is provided with a recess registering with the recess in sleeve B in which the key G fits to lock the sprocket wheel and collar or sleeve together so that rotation of one produces rotation of the other.

I is a nut provided with internal screw threads corresponding with and fitting the screw threads C on collar or sleeve B. The nut I is cut away as at J, J, (Fig. 1), to permit the placing of a wrench thereon to turn it to place.

K, K, are holes in sprocket wheel H and L is a split pin in place in one of the holes K. The purpose of the split pin L is to lock the nut I in place after the device has been assembled, and such holes are so placed that but little turning of the nut I from a given position is required to expose some one of such holes so that pin L can be inserted therein.

The several parts of the device may be assembled as follows;—Collar or sleeve G is placed on counter shaft A and sprocket wheel H is placed on the sleeve or collar B. Feathers or keys F and G are inserted in place and the sprocket wheel H lined up with the corresponding sprocket wheel on the rear wheel of the automobile. Care is taken that a reasonably tight fit is, at such time, obtained between the sleeve B and counter shaft A and between the sprocket wheel H and the collar or sleeve B. Nut F is then put in place on collar or sleeve B and turned until brought into close contact with the adjacent face of sprocket wheel H. A wrench or key is then placed on the nut H and such nut turned against the sprocket wheel and thereby such sprocket wheel is forced laterally further onto the cone shaped portion of the sleeve B and the cut or opening of such sleeve (between lines E, E,) reduced until the sleeve fits tightly to the counter shaft. The split pin L is then inserted in the exposed one of the holes K and the ends of such split pin are opened as shown in the drawing. When thus assembled the sprocket wheel H, collar or sleeve B, and counter shaft A are locked firmly together. To re-adjust the sprocket wheel H; that is, to move it laterally on counter shaft A, the split pin L is removed, nut I is loosened, the sprocket wheel is loosened on collar B and such collar is moved on the counter shaft, after which the nut I is again tightened in place and sprocket pin L again inserted in the exposed one of the holes K.

The sprocket wheel H can be removed at any time and a sprocket wheel with a different number of sprockets substituted therefor, in substantially the same manner that such sprocket wheel H is placed on the automobile and adjusted.

Having thus described my invention and the construction of a device embodying the same, what I claim as new and desire to secure by Letters Patent is:—

The combination of a split sleeve, a shaft, a key interposed between the sleeve and the shaft, said sleeve provided with a conical periphery at one end thereof, and with external screw threads at the other end thereof, a sprocket wheel provided with a central hole arranged to fit the conical periphery of the sleeve, a key interposed between the sprocket wheel and the sleeve, a nut provided with internal screw threads arranged to fit the screw threads on the sleeve, and a split pin, said sprocket wheel being provided with holes and said nut arranged to cover the said holes and provided with a flat side arranged to successively uncover said holes as the nut is turned into place, so that when the split pin is in said uncovered hole the nut is locked; substantially as described.

OTTO CULLMAN.

In the presence of—
 CHARLES TURNER BROWN,
 CORA A. ADAMS.